United States Patent
Ogawa et al.

(10) Patent No.: US 10,112,845 B2
(45) Date of Patent: Oct. 30, 2018

(54) LEPIDOCROCITE-TYPE TITANATE, METHOD FOR PRODUCING SAME, AND RESIN COMPOSITION CONTAINING SAME

(71) Applicant: OTSUKA CHEMICAL CO., LTD., Osaka-shi, Osaka (JP)

(72) Inventors: Hidetoshi Ogawa, Tokushima (JP); Hiroyoshi Mori, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 80 days.

(21) Appl. No.: 15/023,811

(22) PCT Filed: Sep. 16, 2014

(86) PCT No.: PCT/JP2014/074404
§ 371 (c)(1),
(2) Date: Mar. 22, 2016

(87) PCT Pub. No.: WO2015/045954
PCT Pub. Date: Apr. 2, 2015

(65) Prior Publication Data
US 2016/0214870 A1    Jul. 28, 2016

(30) Foreign Application Priority Data
Sep. 30, 2013 (JP) ................ 2013-204575

(51) Int. Cl.
| | |
|---|---|
| C01G 9/06 | (2006.01) |
| C01G 23/00 | (2006.01) |
| C08K 3/24 | (2006.01) |
| C09K 3/14 | (2006.01) |
| C01G 49/00 | (2006.01) |
| C08K 3/22 | (2006.01) |

(52) U.S. Cl.
CPC ......... *C01G 23/006* (2013.01); *C01G 23/003* (2013.01); *C01G 23/005* (2013.01); *C01G 49/009* (2013.01); *C01G 49/0018* (2013.01); *C08K 3/22* (2013.01); *C08K 3/24* (2013.01); *C09K 3/149* (2013.01); *C01P 2002/22* (2013.01); *C01P 2002/72* (2013.01); *C01P 2004/61* (2013.01); *C08K 2003/2203* (2013.01); *C08K 2003/2217* (2013.01); *C08K 2003/2237* (2013.01); *C08K 2003/2248* (2013.01); *C08K 2003/2265* (2013.01)

(58) Field of Classification Search
CPC ..................................................... C01G 23/006
USPC ........................................................... 523/149
See application file for complete search history.

(56) References Cited

U.S. PATENT DOCUMENTS

| | | | |
|---|---|---|---|
| 2003/0147804 A1 | 8/2003 | Ogawa et al. | |
| 2003/0147819 A1* | 8/2003 | Watanabe | A61K 8/29 424/63 |
| 2004/0253173 A1 | 12/2004 | Ogawa et al. | |
| 2010/0093908 A1* | 4/2010 | Aki | C01G 23/003 524/413 |

FOREIGN PATENT DOCUMENTS

| | | |
|---|---|---|
| CN | 1575259 A | 2/2005 |
| CN | 101616869 A | 12/2009 |
| CN | 101721317 A | 6/2010 |
| JP | 2010-105843 A | 5/2010 |
| JP | 2010-106123 * | 5/2010 |
| JP | 2010-106123 A | 5/2010 |
| WO | 02/10069 A1 | 2/2002 |
| WO | 03/037797 A1 | 5/2003 |
| WO | 2012/066968 A1 | 5/2012 |

OTHER PUBLICATIONS

Machine translation of JP 2010-106123 (Year: 2010).*
Office Action dated Sep. 5, 2016, issued in counterpart Chinese Patent Application No. 201480053140.3. (8 pages).
International Search Report dated Nov. 11, 2014, issued in counterpart International Application No. PCT/JP2014/074404 (1 page).
Notification of Transmittal of Translation of the International Preliminary Report on Patentability (Forms PCT/IB/338) issued in counterpart International Application No. PCT/JP2014/074404 dated Apr. 14, 2016 with Forms PCT/IB/373 and PCT/ISA/237. (7 pages).

* cited by examiner

*Primary Examiner* — Doris L Lee
(74) *Attorney, Agent, or Firm* — Westerman, Hattori, Daniels & Adrian, LLP

(57) ABSTRACT

Provided is a lepidocrocite-type titanate capable of suppressing the interference with the curing of a thermosetting resin and a resin composition having excellent wear resistance. A lepidocrocite-type titanate has a layered structure formed by chains of $TiO_6$ octahedra, wherein part of Ti sites is substituted with ions of two or more metals selected from the group consisting of Li, Mg, Zn, Ni, Cu, Fe, Al, Ga, and Mn and runs of at least one metal selected from alkali metals other than Li are contained between layers of the layered structure.

6 Claims, 1 Drawing Sheet

[FIG. 1]
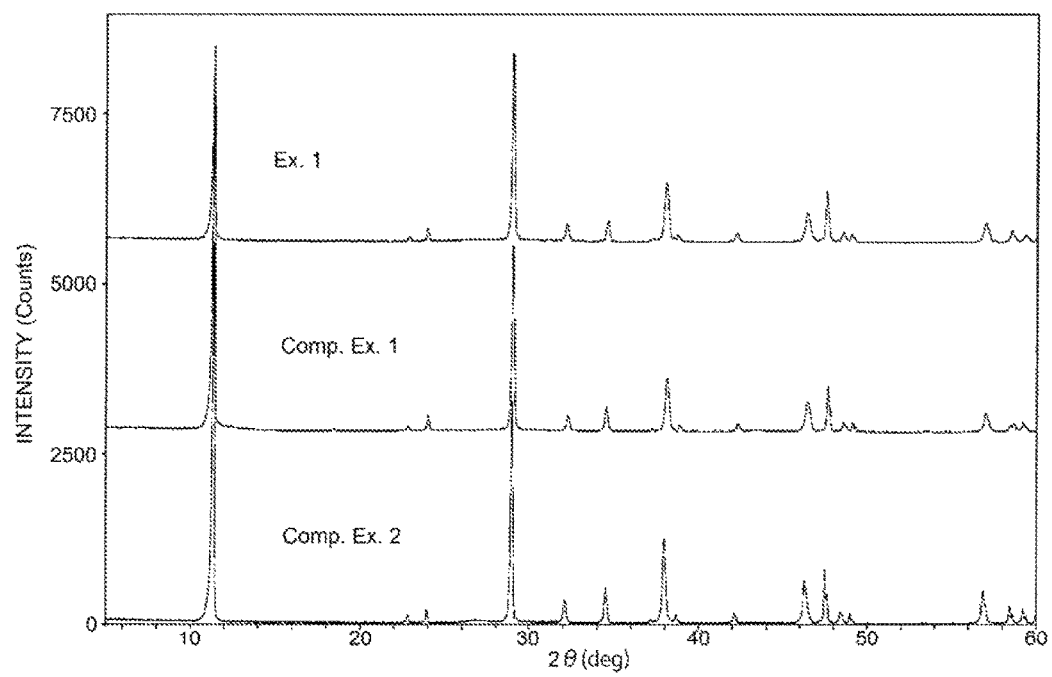
[FIG. 2]
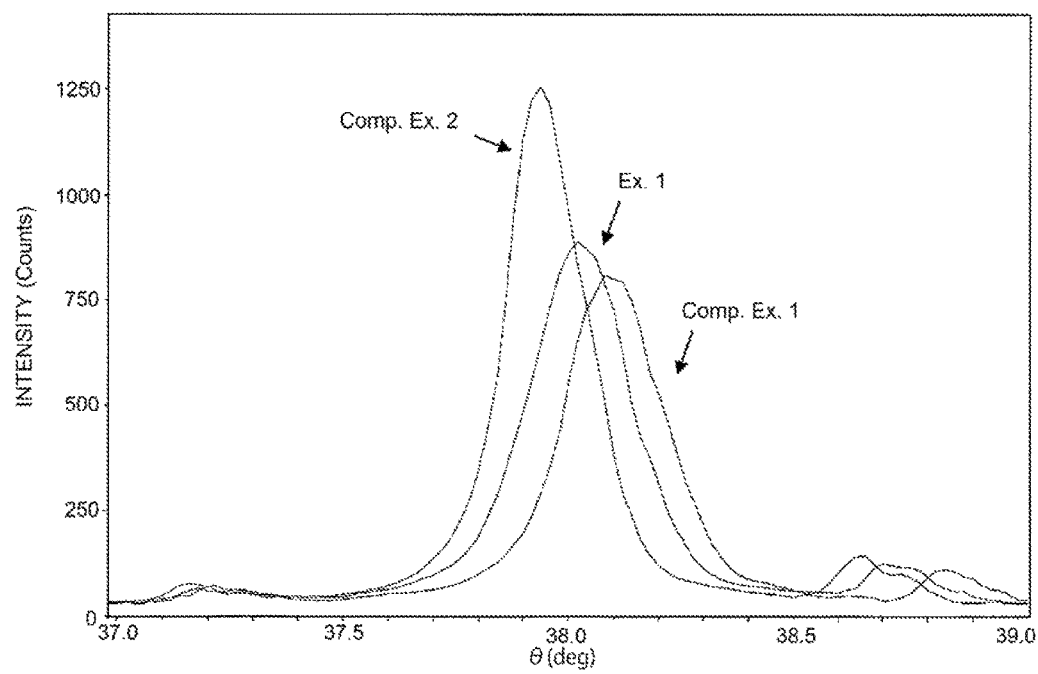

LEPIDOCROCITE-TYPE TITANATE, METHOD FOR PRODUCING SAME, AND RESIN COMPOSITION CONTAINING SAME

TECHNICAL FIELD

The present invention relates to lepidocrocite-type titanates, methods for producing the same, and resin compositions containing the same.

BACKGROUND ART

Friction materials for use in brake systems for various vehicles, industrial machines, and so on are required to have high and stable coefficients of friction, excellent wear resistance, and low aggressiveness against rotors. To meet these characteristics, use was made as the friction materials of resin compositions in which asbestos, an inorganic filler, an organic filler, and so on are compounded with a thermosetting resin (hinder), such as a phenolic resin, for binding the above additives. However, because asbestos has been confirmed to be carcinogenic and is easily ground into dust, its use is refrained owing to environmental health problems attributable to its inhalation at work and potassium titanate fibers, metal fibers, and the like are used as alternatives.

Potassium titanate fibers have the advantage of keeping from damaging rotors. However, their wear resistance in a high temperature range is not adequate. As a solution to this, Patent Literature 1 proposes using as a friction modifier scaly magnesium potassium titanate ($K_{0.2 \text{ to } 0.7}Mg_{0.4}Ti_{1.6}O_{3.7 \text{ to } 4}$). Furthermore, Patent Literature 2 proposes using as a friction modifier scaly lithium potassium titanate ($K_{0.5 \text{ to } 0.7}Li_{0.27}Ti_{1.73}O_{3.85 \text{ to } 3.95}$).

Use is made as the metal fibers of copper fibers having low aggressiveness against rotors in order to enhance the strength of friction materials and improve the heat dissipation efficiency and wear resistance of the friction materials. To further improve the wear resistance, copper powder is also used in large amounts. However, as for friction materials containing copper, abrasion powder produced from them during braking contains copper, which leads to the suggestion that copper may cause river, lake, and marine pollutions and the like. Therefore, the amount of use of copper for friction materials has been restricted in North America. To cope with this, Patent Literature 3 proposes using as a friction material a resin composition containing lithium potassium titanate and graphite.

CITATION LIST

Patent Literature

Patent Literature 1: WO 2002/010069
Patent Literature 2: WO 2003/037797
Patent Literature 3: WO 9012/066968

SUMMARY OF INVENTION

Technical Problem

However, in titanates used in Patent Literatures 1, 2, and 3, their crystal structure is a layered structure, which presents a problem that, during forming of a resin composition, alkali metal ions coordinated between layers of the layered structure are eluted to cause interference with the curing of a thermosetting resin forming a matrix of the resin composition. For this reason, it is necessary to raise the forming temperature or increase the forming time or the resultant resin composition may be deteriorated.

An object of the present invention is to provide a lepidocrocite-type titanate capable of suppressing the interference with the curing of a thermosetting resin and a resin composition having excellent wear resistance.

Solution to Problem

The present invention provides the following lepidocrocite-type titanate method for producing the same, and resin composition containing the same.

Aspect 1: A lepidocrocite-type titanate having a layered structure formed by chains of $TiO_6$ octahedra, wherein part of Ti sites is substituted with ions of two or more metals selected from the group consisting of Li, Mg, Zn, Ni, Cu, Fe, Al, Ga, and Mn and ions of at least one metal selected from alkali metals other than Li are contained between layers of the layered structure.

Aspect 2: The lepidocrocite-type titanate according to aspect 1, wherein 10 to 40% by mole of the Ti sites is substituted with ions of two or more metals selected from the group consisting of Li, Mg, Zn, Ni, Cu, Fe, Al, Ga, and Mn.

Aspect 3: The lepidocrocite-type titanate according to aspect 2, wherein the ions of the two or more metals are Li ions and ions of one or more of the metals other than Li.

Aspect 4: The lepidocrocite-type titanate according to any one of aspects 1 to 3, being represented by a composition formula, $A_{0.5 \text{ to } 0.7}Li_{0.27-x}M_yTi_{1.73-z}O_{3.85 \text{ to } 3.95}$, where A is an alkali metal other than lithium; M is at least one metal selected from the group consisting of Mg, Zn, Ni, Cu, Fe, Al, Ga, and Mn (except for any combination of two or more metals having different valences of ions); when N is a divalent metal, $x=2y/3$ and $z=y/3$; and when M is a trivalent metal, $x=y/3$, $z=2y/3$, and $0.004 \le y \le 0.4$.

Aspect 5: resin composition containing the lepidocrocite-type titanate according to any one of aspects 1 to 4 and a thermosetting resin.

Aspect 6: A friction material containing the resin composition according to aspect 5.

Aspect 7: A method for producing the lepidocrocite-type titanate according to any one of aspects 1 to 4, the method including the steps of: firing a mixture of source materials; acid-washing the fired mixture; and firing the mixture again after being acid-washed.

Advantageous Effects of Invention

The lepidocrocite-type titanate of the present invention can suppress the interference with the curing of a thermosetting resin. The resin composition of the present invention can be cured free from interference with curing. The resin composition of the present invention has excellent wear resistance. By the producing method of the present invention, the lepidocrocite-type titanate of the present invention can be efficiently produced.

BRIEF DESCRIPTION OF DRAWINGS

FIG. 1 is a graph showing X-ray diffraction charts of powders obtained in Example 1 and Comparative Examples 1 and 2.

FIG. 2 is an enlarged graph of portions corresponding to the (041) planes in the X-ray diffraction charts of the powders obtained in Example 1 and Comparative Examples 1 and 2.

DESCRIPTION OF EMBODIMENTS

Hereinafter, a description will be given of an example of a preferred embodiment for working of the present invention. However, the following embodiment is simply illustrative. The present invention is not at all intended to be limited to the following embodiment.

A titanate of the present invention is a lepidocrocite-type titanate and consists of crystals that have a layered structure formed by chains of $TiO_6$ octahedra and contain metal ions between layers of the layered structure. The layers are originally electrically neutral but negatively charged by substituting part of tetravalent Ti sites with monovalent to trivalent metal ions. These negative charges are compensated for by the metal ions located between the layers.

The metal ions with which part of the Ti sites is substituted are ions of two or more metals selected from the group consisting of Li, Mg, Zn, Ni, Cu, Fe, Al, Ga, and Mn having ionic radii comparable with that of $Ti^{4+}$. Preferably, 10 to 40% by mole of the Ti sites is substituted with ions of two or more metals selected from the group consisting of Li, Mg, Zn, Ni, Cu, Fe, Al, Ga, and Mn. More preferably, 10 to 30% by mole of the Ti sites is substituted with ions of two or more metals selected from the group consisting of Li, Mg, Zn, Ni, Cu Fe, Al, Ga, and Mn.

Furthermore, the metal ions with which part of the Ti sites is substituted are preferably Li ions and ions of at least one metal selected from the group consisting of Mg, Zn, Ni, Cu, Fe, Al, Ga, and Mn. More preferably, they are Li ions and ions of at least one metal selected from the group consisting of Mg, Zn, Ni, Cu, Fe, Al, Ga, and Mn and the content of the Li ions in all the selected metal ions is 20 to 99% by mole. Still more preferably, they are Li ions and ions of at least one metal selected from the group consisting of Mg, Zn, Ni, Cu, Fe, Al, Ga, and Mn and the content of the Li ions in all the selected metal ions is 20 to 90% by mole (hereinafter, these metals are referred to collectively as "M metals").

Whereas conventional titanates are formed of crystals in which part of Ti sites is substituted with ions of one metal, the titanate of the present invention is formed by substituting part of Ti sites with ions of two or more metals. Thus the interference with the curing of a thermosetting resin can be suppressed. The reason why the interference with the curing of a thermosetting resin can be suppressed is not particularly clear, but it can be considered that the elution of alkali metal ions between the layers is prevented, so that the interference with the curing of a thermosetting resin can be suppressed.

The metal ions located between the layers are those of one or more alkali metals other than Li having a small ionic radius. Examples of the alkali metal that can be cited include Na, K, Rb, and Cs and the preferred alkali metal is K (hereinafter, these metals are referred to collectively as "A metals"). Furthermore, it is preferred that an amount of metal ions capable of making the entire crystal electrically neutral should be contained between the layers.

The titanate of the present invention consists of non-fibrous particles in a powdered form, such as a spherical form, a granular form, a platy form, a prismoidal form, a blocky form, an irregular form or a form having a plurality of projections (amoeboid form). These various types of particle forms and particle sizes can be arbitrarily controlled depending on production conditions, particularly the composition of source materials, firing conditions, grinding process conditions after firing process, and so on.

As the powder of the titanate to be blended into resin composition, those having the various types of particle forms described above can be used as appropriate. Although there is no particular limitation as to the particle size, the average particle size is preferably 1 to 50 μm and more preferably 1 to 20 μm. The term average particle size used in the present invention means the particle diameter at 50% cumulative volume in a particle size distribution as determined by the laser diffraction and scattering method.

Examples of the titanate of the present invention that can be cited include those represented by a composition formula, $A_{0.5\ to\ 0.7}Li_{0.27-x}M_yTi_{1.73-z}O_{3.85\ to\ 3.95}$, where A is an alkali metal other than lithium; M is at least one metal selected from the group consisting of Mg, Zn, Ni, Cu, Fe, Al, Ga, and Mn (except for any combination of two or more metals having different valences of ions); when M is a divalent metal, $x=2y/3$ and $z=y/3$; and when M is a trivalent metal, $x=y/3$, $z=2y/3$, and $0.004 \leq y \leq 0.4$. Preferred among them are those represented by composition formulae, $K_{0.5\ to\ 0.7}Li_{0.27-2y/3}Cu_yTi_{1.73-y/3}O_{3.85\ to\ 3.95}$ (where $0.004 \leq y \leq 0.2$), $K_{0.5\ to\ 0.7}Li_{0.27-2y/3}Cu_yTi_{1.73-y/3}O_{3.85\ to\ 3.95}$ (where $0.004 \leq y \leq 0.2$), and $K_{0.5\ to\ 0.7}Li_{0.27-y/3}Fe_yTi_{1.73-2y/3}O_{3.85\ to\ 3.95}$ (where $0.004 \leq y \leq 0.4$).

Although no particular limitation is placed on the method for producing the titanate of the present invention, the titanate can be obtained by using, as source materials, titanium oxide or a compound capable of producing titanium oxide by the application of heat thereto, an oxide of an A metal or a compound capable of producing an oxide of an A metal by the application of heat thereto, and an oxide of an N metal or a compound capable of producing an oxide of an M metal by the application of heat thereto, mixing these source materials, adding a flux for the purposes of reaction homogenization and/or crystal growth as necessary, firing (primarily firing) the resultant mixture of source materials, acid-washing the resultant primarily fired product, and then firing (secondarily firing) the acid-washed product again. The mixture ratio of the source materials can be appropriately adjusted according to the composition formula of a desired lepidocrocite-type titanate.

The compounds capable of producing titanium oxide by the application of heat thereto that can be used include low-order titanium oxide, aqueous materials of titanium oxide, titanium oxide hydrates, and titanium hydroxide. The compounds capable of producing an oxide of an A metal by the application of heat thereto that can be used include carbonates, hydroxides, nitrates, and sulfates of the A metal and, among them, carbonates and hydroxides are preferred. The compounds capable of producing an oxide of an M metal by the application of heat thereto that can be used include carbonates, hydroxides, oxides, nitrates, and sulfates of the A metal and, among them, oxides, carbonates, and hydroxides are preferred. Examples of the flux that can be cited include potassium chloride, potassium fluoride, potassium molybdate, and potassium tungstate and, among them, potassium chloride is preferred. The ratio of addition of the flux is 3:1 to 3:15 and preferably 3:3.5 to 3:10 in a molar ratio relative to the source materials (source material to flux).

The primary firing is performed using an electric furnace or the like, wherein the firing reaction can be completed by holding the source material mixture within a temperature range of 800 to 1100° C. for 1 to 24 hours.

The acid washing can be performed by grinding the primarily fired product into an appropriate size, dispersing the resultant ground product into water to form an aqueous slurry, adding an acid to the aqueous slurry, and then stirring the slurry. The concentration of the aqueous slurry is not particularly limited and can be appropriately selected from a wide range of concentrations, but, in consideration of workability and so on, it is sufficient to be about 1 to 30% by mass and preferably about 2 to 20% by mass. Examples of the acid that can be cited include inorganic acids, such as sulfuric acid, hydrochloric acid, and nitric acid, and organic acids, such acid. The acid may used in a combination of two or more acids as necessary. The amount of acid added to the aqueous slurry is sufficient to be an amount at which the pH of the aqueous slurry reaches 7 to 11 and preferably 7 to 9. The measurement of the pH of the aqueous slurry is made after the aqueous slurry to which an acid has been added is stirred for about one to five hours. The acid is normally used in the form of an aqueous solution. The concentration of the acid aqueous solution is not particularly limited and can be appropriately selected from a wide range of concentrations, but it is sufficient to be about 1 to 98% by mass. After the pH of the aqueous slurry is adjusted in the above predetermined range, the solid content is separated from the aqueous slurry by filtration, centrifugation or other processes. The separated solid content can be, if necessary, washed with water and dried.

The secondary firing is performed using an electric furnace or the like, wherein the firing reaction can be completed by holding the solid content obtained by the acid washing within a temperature range of 400 to 700° C. for 1 to 24 hours. After the secondary firing, the resultant powder may be ground into a desired size or passed through a sieve to loosen it.

In the above manner, the titanate of the present invention can be obtained.

A resin composition of the present invention is featured by containing the above-described titanate and a thermosetting resin. The thermosetting resin that can be used is an arbitrary one appropriately selected from among known thermosetting resins. Examples that can be cited include phenolic resins, formaldehyde resins, melamine resins, epoxy resins, acrylic resins, aromatic polyester resins, and urea resins. One of them can be used alone or two or more of them can be used in combination. Preferred among they are phenolic resins. The titanate of the present invention may be used after being subjected to a surface treatment with a silane coupling agent, a titanate-based coupling agent or the like in the usual manner for the purposes of improving the dispersibility, the adhesiveness to the thermosetting resin, and so on. There is no particular limitation as to the content of the titanate of the present invention in the resin composition, but it is preferably 3 to 30% by volume of the total resin composition.

The resin composition of the present invention can be used for products requiring wear resistance and can be suitably used particularly for friction materials, such as brake pads, brake linings, and clutch facings for various vehicles and industrial machines. Furthermore, the resin composition of the present invention can achieve excellent wear resistance without containing copper, such as copper powder or copper fibers, from the viewpoint of consideration for natural environment.

In using the resin composition of the present invent/on as a friction material, the resin composition is appropriately blended, depending on required characteristics, together with a known fibrous base material, a friction modifier, and so on, and the mixture is formed into a shape at a predetermined pressure and normal temperature, then thermoformed at a predetermined temperature, and the subjected to thermal treatment and finishing, so that a formed body of a friction material can be produced.

Examples of the fibrous base material include: organic fibers, such as aramid fibers and acrylic fibers; metal fibers, such as steel fibers and copper fibers; inorganic fibers, such as glass fibers, rock wool, ceramic fibers, biodegradable fibers, biosoluble fibers, and wollastonite fibers; and carbon fibers. One of them can be used alone or two or More of them can be used in combination.

Examples of the friction modifier include: organic powders, such as vulcanized or unvulcanized natural or synthetic rubber, cashew dust, and resin dust; inorganic powders, such as graphite, carbon black, molybdenum disulfide, antimony trisulfide, barium sulfate, calcium carbonate, clay, mica, and talc; metal powders, such as copper, aluminum, zinc, and iron; and oxide powders, such as alumina, silica, magnesia, zirconia (zirconium oxide), chromium oxide, molybdenum dioxide, zirconium silicate, titanium oxide, and iron oxide. One of them can be used alone or two or more of them can be used in combination.

EXAMPLES

The present invention will be described below in further detail with reference to specific examples. The present invention is not at all limited by the following examples and modifications and variations may be appropriately made therein without changing the gist of the invention.

<Production of Titanate>

The particle form of the titanate was confirmed with a field-emission scanning electron microscope (S-4.800 manufactured by Hitachi High-Technologies Corporation), the crystal structure thereof was confirmed with an X-ray diffraction measurement device (RINT2000-Ultima+ manufactured by Rigaku Corporation), the composition formula thereof was confirmed with an ICP-AES analyzer (SPS5100 manufactured by SII Nano Technology Inc.), the melting point thereof was measured with a simultaneous differential thermogravimetric measurement device (EXSTAR6000 TG/DTA6300 manufactured by SII Nano. Technology Inc.), and the average particle size thereof was measured with a laser diffraction particle size distribution measurement device (SALD-2100 manufactured by Shimadzu Corporation).

Example 1

An amount of 516.7 g of titanium oxide, 214.6 g of potassium carbonate, 19.4 g of lithium carbonate, and 45.3 g of magnesium hydroxide were mixed for one hour while being ground with a vibration mill.

An amount of 500 g of the resultant ground mixture powder was packed into a crucible and then fired at 950° C. for four hours in an electric furnace and the fired product was ground with a hammer mill.

An amount of 200 g of the resultant ground product was dispersed into 800 g of deionized water, followed by stirring for two hours to prepare a slurry. An amount of 5.2 g of 98% sulfuric acid was added to the slurry, followed by stirring for two hours to adjust the PH to 9. The solid content of the slurry was filtered out and dried. After drying, the solid content was packed into a crucible and fired at 500° C. for one hour in an electric furnace.

The resultant powder was confirmed to consist of platy, lepidocrocite-type layered crystals and have a composition of $K_{0.7}Li_{0.13}Mg_{0.2}Ti_{1.67}O_{3.95}$. Furthermore, the melting point was 1270° C. and the average particle size was 3.3 μm.

The X-ray diffraction chart of the resultant powder is shown in FIGS. 1 and 2. FIG. 2 is an enlarged graph of a portion corresponding to the (041) plane of the resultant powder.

Example 2

An amount of 506.2 g of titanium oxide, 210.3 g of potassium carbonate, 19.0 g of lithium carbonate, and 60.5 g of copper (II) oxide were mixed for one hour while being ground with a vibration mill.

An amount of 500 g of the resultant ground mixture powder was fired at 900° C. for four hours in an electric furnace and the fired product was ground with a hammer mill.

An amount of 200 g of the resultant ground product was dispersed into 800 g of deionized water, followed by stirring for two hours to prepare a slurry. An amount of 5.2 g of 98% sulfuric acid was added to the slurry, followed by stirring for two hours to adjust the PH to 7. The solid content of the slurry was filtered out and dried. After drying, the solid content was packed into a crucible and fired at 500° C. for one hour in an electric furnace.

The powder was confirmed to consist of platy, lepidocrocite-type layered crystals and have a composition of $K_{0.7}Li_{0.13}Cu_{0.2}Ti_{1.67}O_{3.95}$. Furthermore, the melting point was 1103° C. and the average particle size was 6.2 μm.

Example 3

An amount of 445.4 g of titanium oxide, 210.2 g of potassium carbonate, 19.0 g of lithium carbonate, and 121.5 g of iron (III) oxide were mixed for one hour while being ground with a vibration mill.

An amount of 500 g of the resultant ground mixture powder was fired at 950° C. for four hours in an electric, furnace and the fired product was ground with a hammer mill.

An amount of 200 g of the resultant ground product was dispersed into 800 g of deionized water, followed by stirring for two hours to prepare a slurry. An amount of 5.2 g of 98% sulfuric acid was added to the slurry, followed by stirring for two hours to adjust the PH to 9. The solid content of the slurry was filtered out and dried. After drying, the solid content was packed into a crucible and fired at 500° C. for one hour in an electric furnace.

The resultant powder was confirmed to consist of platy, lepidocrocite-type layered crystals and have a composition of $K_{0.7}Li_{0.13}Fe_{0.4}Ti_{1.47}O_{3.95}$. Furthermore, the melting point was 1193° C. and the average particle size was 2.7 μm.

Example 4

An amount of 536.1 g of titanium oxide, 215.8 g of potassium carbonate, 35.0 g of lithium carbonate, and 9.1 g of magnesium hydroxide were mixed for one hour while being ground with a vibration mill.

An amount of 500 g of the resultant ground mixture powder was packed into a crucible and then fired at 900° C. for four hours in an electric furnace and the fired product was ground with a hammer mill.

An amount of 200 g of the resultant ground product was dispersed into 800 g of deionized water, followed by stirring for two hours to prepare a slurry. An amount of 5.2 g of 98% sulfuric acid was added to the slurry, followed by stirring for two hours to adjust the PH to 9. The solid content of the slurry was filtered out and dried. After drying, the solid content was packed into a crucible and fired at 500° C. for one hour in an electric furnace.

The resultant powder was confirmed to consist of platy, lepidocrocite-type layered crystals and have a composition of $K_{0.7}Li_{0.24}Mg_{0.04}Ti_{1.72}O_{3.95}$. Furthermore, the melting point was 12.00° C. and the average particle size was 2.8 μm.

Comparative Example 1

An amount of 540.9 g of titanium oxide, 216.1 g of potassium carbonate, and 39.0 g of lithium carbonate were mixed for one hour while being ground with a vibration mill.

An amount of 500 g of the resultant ground mixture powder was packed into a crucible and then fired at 900° C. for four hours in an electric furnace and the fired product was ground with a hammer mill.

An amount of 200 g of the resultant ground product was dispersed into 800 g of deionized water, followed by stirring for two hours to prepare a slurry. An amount of 5.2 g of 98% sulfuric acid was added to the slurry, followed by stirring for two hours to adjust the PH to 9. The solid content of the slurry was filtered out and dried. After drying, the solid content was packed into a crucible and fired at 500° C. for one hour in an electric furnace.

The resultant powder was confirmed to consist of platy, lepidocrocite-type layered crystals and have a composition of $K_{0.7}Li_{0.27}Ti_{1.73}O_{3.95}$. Furthermore, the melting point was 1192° C. and the average particle size was 2.4 μm.

The X-ray diffraction chart of the resultant powder is shown in FIGS. 1 and 2. FIG. 2 is an enlarged graph of a portion corresponding to the (041) plane of the resultant powder.

Comparative Example 2

An amount of 492.9 g of titanium oxide, 213.2 g of potassium carbonate, and 89.9 g of magnesium hydroxide were mixed for one hour while being ground with a vibration mill.

An amount of 500 g of the resultant ground mixture powder was packed into a crucible and then fired at 1000° C. for four hours in an electric furnace and the fired product was ground with a hammer mill.

An amount of 200 g of the resultant ground product was dispersed into 800 g of deionized water, followed by stirring for two hours to prepare a slurry. An amount of 5.2 g of 98% sulfuric acid was added to the slurry, followed by stirring for two hours to adjust the PH to 9. The solid content of the slurry was filtered out and dried. After drying, the solid content was packed into a crucible And fired at 500° C. for one hour in an electric furnace.

The resultant powder was confirmed to consist of platy, lepidocrocite-type layered crystals and have a composition of $K_{0.7}Mg_{0.4}Ti_{1.6}O_{3.95}$. Furthermore, the melting point was 1.295° C. and the average particle size was 3.5 μm.

The X-ray diffraction chart of the resultant powder is shown in FIGS. 1 and 2. FIG. 2 is an enlarged graph of a portion corresponding to the (041) plane of the resultant powder.

<Measurement of Curing Exothermic Peak Temperature>

Test Examples 1 to 7

An amount of 150 mg of each titanate described in Table 1 and 50 mg of a phenolic resin (SUMILITERESIN®PR-50064 manufactured by Sumitomo Bakelite Co., Ltd.) were mixed in an agate mortar. The resultant mixture powder was measured at a rate of temperature rise of 2° C./min under a nitrogen stream (50 ml/min) using a differential scanning calorimeter (EXSTAR6000 DSC6220 manufactured by SII Nano Technology Inc.). From data of the differential scanning calorimeter, the curing exothermic peak temperature was calculated in conformity with the method defined in JIS K5910-2007. The results are shown in Table 1.

TABLE 1

|  | Titanate Used | Curing Exothermic Peak Temperature (° C.) |
|---|---|---|
| Test Ex. 1 | Ex. 1 (lithium magnesium potassium titanate) | 144 |
| Test Ex. 2 | Ex. 2 (lithium copper potassium titanate) | 144 |
| Test Ex. 3 | Ex. 3 (lithium iron potassium titanate) | 145 |
| Test Ex. 4 | Ex. 4 (lithium magnesium potassium titanate) | 147 |
| Test Ex. 5 | Comp. Ex. 1 (lithium potassium titanate) | 155 |
| Test Ex. 6 | Comp. Ex. 2 (magnesium potassium titanate) | 156 |
| Test Ex. 7 | 1:1 Mixture of Comp. Ex. 1 and Comp. Ex. 2 | 155 |

It can be seen from the results in Table 1 that because Test Examples 1 to 4 had low curing exothermic peak temperatures as compared to Test Examples 5 and 6, the titanate of the present invention suppressed the interference with the curing of the thermosetting resin. Furthermore, it can be seen from Test Example 7 that a simple mixture of titanates of Comparative Examples 1 and 2 could not achieve the effects of the present invention.

<Production of Friction Material>

Example 5

An amount of 12 parts by mass of a phenolic resin (SUMILITERESIN®PR-50064 manufactured by Sumitomo Bakelite Co., Ltd.), 8 parts by mass of a mixture of aramid pulp and friction dust, 28 parts by mass of barium sulfate, 26 parts by mass of an inorganic filler, and 6 parts by mass of graphite were blended into 15 parts by mass of the titanate obtained in Example 1 and mixed with a Lodige mixer and the obtained mixture was preliminarily formed (at 25 MPa), thermoformed, (at 150° C. and 20 MPa), and further subjected to a thermal treatment (at 160 to 210° C.) to produce a disc brake pad. The disc brake pad here refers to one having a shape shown in FIG. 20-152 (No. 152-4) of JIS D0107 and is a friction material for use in a disc brake system.

Example 6

A disc brake pad was produced in the same manner as in Example 5 except that the titanate obtained in Example 2 was used in place of that obtained in Example 1.

Example 7

A disc brake pad was produced in the same manner as in Example 5 except that the titanate obtained in Example 3 was used in place of that obtained in Example 1.

Comparative Example 3

A disc brake pad was produced in the same manner as in Example 5 except that the titanate obtained in Comparative Example 1 was used in place of that obtained in Example 1.

Comparative Example 4

A disc brake par was produced in the same manner as in Example 5 except that the titanate obtained in Comparative Example 2 was used in place of that obtained in Example 1.

<Evaluation of Friction Material>

The porosity of the friction material was measured based on JIS D4418. The amount of wear of the friction material was measured in conformity with JASO 5427 and using a dynamometer. The appearance of the friction material after being subjected to friction was evaluated by considering the friction surface of the friction material obtained in Example 6 as the normal signified by a circle, making comparisons with the other friction materials in terms of the degree of cracks and the degree of whitening, and assigning grades double circle, circle, and cross in order of condition from better to worse. The results are shown in Table 2.

TABLE 2

| | | FRICTION MATERIAL PROPERTIES | | | | | |
|---|---|---|---|---|---|---|---|
| | | POROSITY | AMOUNT OF WEAR (mm/1000 cycles) | | | | AFTER FRICTION |
| | Titanate Used | (%) | 100° C. | 200° C. | 300° C. | 400° C. | APPEARANCE |
| Ex. 5 | Ex. 1 (lithium magnesium potassium titanate) | 11.1 | 0.18 | 0.12 | 0.40 | 0.34 | ⊚ |
| Ex. 6 | Ex. 2 (lithium copper potassium titanate) | 12.1 | 0.19 | 0.14 | 0.36 | 0.35 | ○ |
| Ex. 7 | Ex. 3 (lithium iron potassium titanate) | 11.5 | 0.21 | 0.15 | 0.42 | 0.35 | ○ |
| Comp. Ex. 3 | Comp. Ex. 1 (lithium potassium titanate) | 10.5 | 0.20 | 0.14 | 0.39 | 0.31 | x |
| Comp. Ex. 4 | Comp. Ex. 2 (magnesium potassium titanate) | 10.3 | 0.18 | 0.13 | 0.38 | 0.32 | x |

As seen from the results in Table 2, in Comparative Examples 3 and 4 in which conventional titanates were used, their appearances after being subjected to friction were degraded. In contrast, in Examples 5 to 7 in which the titanate of the present invention was used, their appearances after being subjected to friction were improved, although their amounts of wear were comparable with those in Comparative Examples 3 and 4. It can be considered that because the use of the titanate of the present invention suppresses the interference with the curing of a thermosetting resin as shown in Table 1, the degree of three-dimensional cross-linking and the matrix strength are increased to improve the appearance of the friction material after being subjected to friction.

The invention claimed is:

1. A resin composition containing:
   a lepidocrocite-type titanate having a layered structure formed by chains of $TiO_6$ octahedra, wherein part of Ti sites is substituted with ions of two or more metals selected from the group consisting of Li, Mg, Zn, Ni, Cu, Fe, Al, Ga, and Mn and ions of at least one metal selected from alkali metals other than Li are contained between layers of the layered structure; and
   a thermosetting resin.

2. The resin composition according to claim 1, wherein 10 to 40% by mole of the Ti sites is substituted with ions of two or more metals selected from the group consisting of Li, Mg, Zn, Ni, Cu, Fe, Al, Ga, and Mn.

3. The resin composition according to claim 1, wherein the ions of the two or more metals are Li ions and ions of one or more of the metals other than Li.

4. The resin composition according to claim 1, being represented by a composition formula, $A_{0.5 \text{ to } 0.7}Li_{0.27-x}M_yTi_{1.73-z}O_{3.85 \text{ to } 3.95}$, where A is an alkali metal other than lithium; M is at least one metal selected from the group consisting of Mg, Zn, Ni, Cu, Fe, Al, Ga, and Mn (except for any combination of two or more metals having different valences of ions); when M is a divalent metal, $x=2y/3$ and $z=y/3$; and when M is a trivalent metal, $x=y/3$, $z=2y/3$, and $0.004 \leq y \leq 0.4$.

5. A resin composition containing:
   a lepidocrocite-type titanate having a layered structure formed by chains of $TiO_6$ octahedra, wherein part of Ti sites is substituted with ions of two or more metals selected from the group consisting of Li, Mg, Zn, Ni, Cu, Al, Ga, and Mn and ions of at least one metal selected from alkali metals other than Li are contained between layers of the layered structure; and
   a thermosetting resin.

6. A friction material containing the resin composition according to claim 1.

* * * * *